No. 708,220. Patented Sept. 2, 1902.
E. R. GILL.
MEANS FOR WINDING CONVERTERS OR LIKE ARTICLES.
(Application filed Mar. 30, 1899.)
(No Model.)
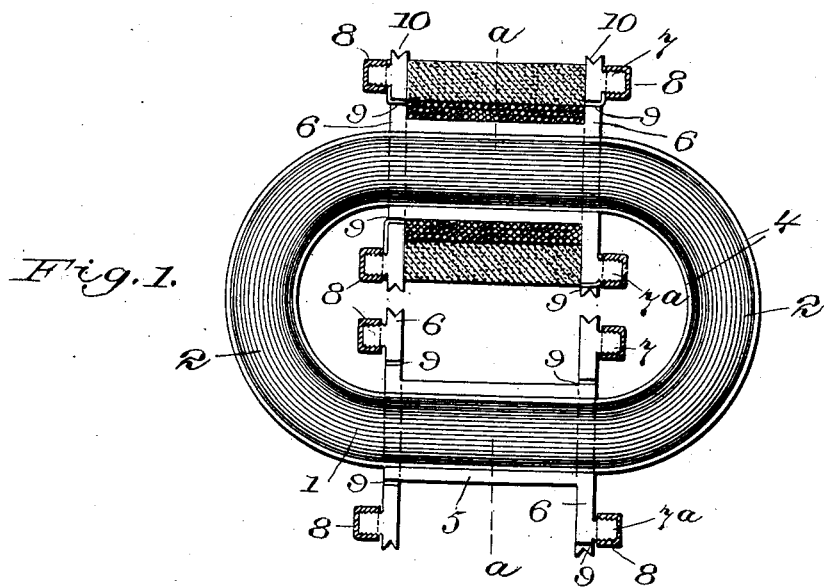
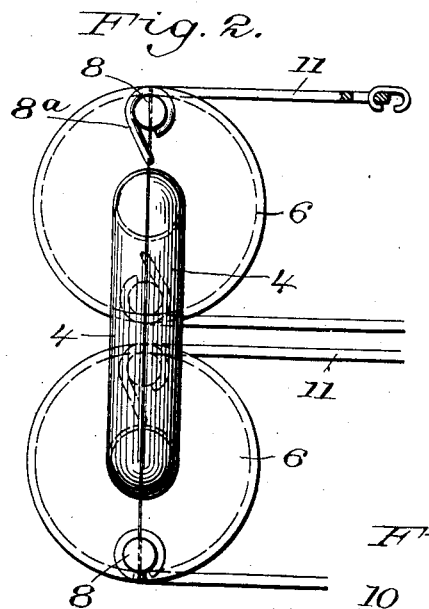
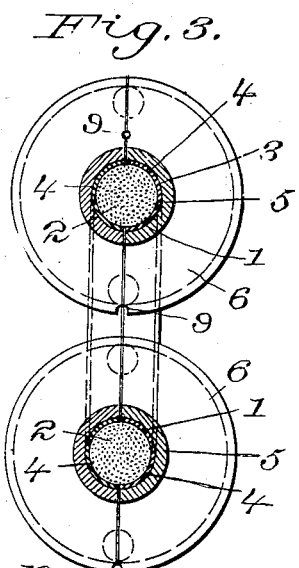
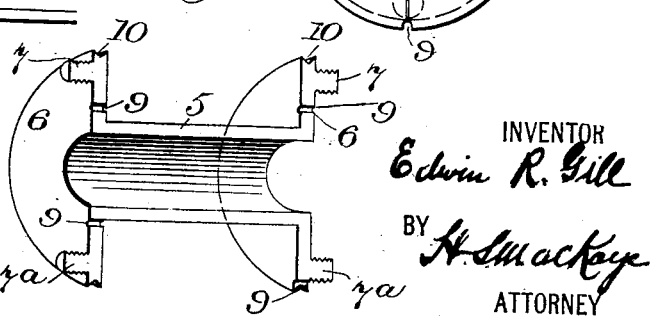
WITNESSES:
INVENTOR
Edwin R. Gill
BY H. Mackaye
ATTORNEY

UNITED STATES PATENT OFFICE.

EDWIN R. GILL, OF NEW YORK, N. Y., ASSIGNOR TO INVENTION DEVELOPING COMPANY, A CORPORATION OF NEW JERSEY.

MEANS FOR WINDING CONVERTERS OR LIKE ARTICLES.

SPECIFICATION forming part of Letters Patent No. 708,220, dated September 2, 1902.

Application filed March 30, 1899. Serial No. 711,080. (No model.)

*To all whom it may concern:*

Be it known that I, EDWIN R. GILL, a citizen of the United States, residing in the city, county, and State of New York, have invented a certain new and useful Improvement in Means for Winding Converters or Like Articles, of which the following is a specification.

My present invention is applicable in some respects to the manufacture of any device wherein it is desirable to quickly and efficiently wind some portion of the article closed upon itself.

More particularly considered, this invention applies to a quick and efficient method and means for winding electrical apparatus having a closed magnetic circuit, and I have shown and claimed said invention especially as applied to a closed-circuit transformer.

The principal advantage of my invention lies in its affording a method and means whereby the iron parts of electrical apparatus can be manufactured with a closed or jointless magnetic circuit and can then receive the winding of electric conductor through the agency of rapidly-operating mechanism, while at the same time providing most efficient insulation between the core and winding. Furthermore, by the practice of this invention transformers and other electrical machines can be so wound as to be very rapidly and cheaply repaired.

My invention as applied to alternating-current transformers in one preferred form is illustrated in the accompanying drawings, wherein—

Figure 1 is a plan view of said transformer shown in process of manufacture. Fig. 2 is an end view of the same as completed. Fig. 3 is a transverse section on the line *a a* of Fig. 1, the copper wire being omitted; and Fig. 4 is a perspective view of a half-spool as preferably made for use with my invention.

I preferably build my transformer-core in an oblong shape, as typified in Fig. 1, the same having two straight sides, as 1, and two rounded ends, as 2. This core may be constructed in a variety of ways, one desirable method of construction being to wind soft-iron wire on the desired form in a lathe or the like, iron wires for this purpose being shown in section at 3 in Fig. 3. Where this or an analogous method is resorted to, I find it preferable to avoid all loss of permeability arising through mechanical strains incident to working by annealing my core after forming, and thus placing the iron molecules in the best possible magnetic condition after the core has been given its final form. This is an advantage which cannot be well attained in those converters wherein stamped iron plates are used, since the core is not in its final form until after the copper wire and its insulation have been applied thereto.

In order to insure uniform cross-section and a smooth surface for the spools hereinafter described, I prefer to apply a soft-iron shell to the wire-core, and this is best applied in two symmetrical halves, as shown in section at 4 in Fig. 3, in plan in Fig. 1, and in end view in Fig. 2. I prefer to anneal the core with the shells in position on the wires, as shown.

The electric conductors for the primary and secondary coils are borne upon spools, which are divisible, preferably, into two parts, similar to that shown in perspective in Fig. 4. The semicylindrical body 5 of each spool-section carries two flanges 6, and at the straight edge of each flange are the halves of two knobs 7 and 7ª, preferably screw-threaded. I prefer to utilize these knobs both to fasten the spool-sections together and to form terminals for the windings in the manner shown in Figs. 1 and 2. For these purposes I employ a metal cap 8, preferably of copper, which screws down upon two juxtaposed knobs 7 and provides a terminal around which the wire end may be wound and properly secured, as shown in Fig. 2 at 8ª. In order to bring the ends of the wires out to these terminals, I provide appropriate apertures or slots 9, as shown.

In the process of manufacturing my transformer the divisible spools are applied to the straight portions of the core, preferably after annealing, and are secured together by means of the caps 8 or otherwise, if desired. The conductors are then wound upon said spools by simply revolving the latter in the usual manner for filling spools after securing one end of the wire to be wound to the spool. In order to accomplish the revolution of the spools, a number of devices may be resorted to; but I prefer to employ the simple grooves 10 for this purpose, preferably in each flange of each spool. It is then only necessary to use jointed belts 11 to turn the spools. The two spools can be wound simultaneously, if desired.

In Fig. 1 I have indicated a primary and secondary wound one upon the other; but it will be understood that my invention is equally well adapted to use of only primary coils upon one spool, the secondaries being wound upon the other, or to any other desired disposition of coils.

The spools may be constructed of any appropriate insulating material, as glass, hard rubber, fiber, or porcelain; also, the number of flanges on each spool may be greater than two without departing from my invention—as, for instance, where it is desired to provide a solid insulating-partition between coils.

The special methods and means employed for insulating successive coils or layers of wire are no part of my present invention and may be various in nature.

It will be understood that I do not limit myself to a core built up as shown and described herein nor to the particular form of core or form and number of spools herein shown and described, since my invention is equally applicable to cores having divided magnetic paths and to the use of one or any number of spools. In short, my method and means are useful and advantageous in any connection wherein the parts to be wound are so nearly closed upon themselves as to prevent ready-wound coils from being slipped into place thereon. For instance, a horseshoe-magnet having enlarged pole-pieces, which prevent ready-wound spools from being slipped onto the legs thereof, may nevertheless be wound, as herein described, by using a divisible spool revoluble upon said legs. In my claims I have therefore used the term "virtually closed" to cover not only the entirely-closed device—such, for instance, as shown in the drawings herewith—but also such partly-closed devices as above mentioned.

It is evident that by use of my method and means for winding many electrical devices can be constructed in one piece which have been hitherto made in parts in order to facilitate the application of the conductors, and thus the reluctance of the magnetic circuits may be lowered. My present invention is therefore not limited to the details herein shown and described, save as limited specifically in the following claims, since many modifications may obviously be made therein by the exercise of the ordinary skill of the calling.

What I claim is—

1. As an article of manufacture, an electrical apparatus with a virtually-closed magnetic circuit having a practically straight portion, a divisible spool on said straight portion, and terminals for the conductors on said spool, said terminals serving also to fasten the parts of said spool together.

2. As an article of manufacture for use with electrical apparatus, a divisible insulating-spool having means for fastening the end of a conductor thereto.

3. As an article of manufacture for use with electrical apparatus, a divisible insulating-spool having terminal conducting-knobs on the outside of the flanges thereof for fastening the ends of the wires to be wound thereon.

4. As an article of manufacture for use with electric apparatus, a divisible insulating-spool having half-knobs on its half-flanges adapted to come together as described, and metallic caps fitting over said half-knobs in pairs when juxtaposed.

5. As an article of manufacture for use with electric apparatus, a divisible insulating-spool having half-knobs on its half-flanges, threaded and adapted to come together as described, and metallic caps adapted to screw onto said half-knobs in pairs when juxtaposed.

6. As an article of manufacture for use with electric apparatus, a divisible insulating-spool having half-knobs on its half-flanges, threaded and adapted to come together as described, metallic caps adapted to screw onto said half-knobs in pairs when juxtaposed, and a circumferential groove on one of said flanges.

7. In a converter, a closed-circuit subdivided core and two half-shells of iron applied to the two sides of said core for confining said laminations.

8. In a converter, a core composed of iron wire wound into shape, and two half-shells of iron applied to the two sides of said core to confine said wire.

9. In a converter, a closed magnetic circuit having a straight portion, a divisible spool revolubly mounted on said straight portion, metallic terminals on the flanges of said spool for holding said spool portions together, and primary and secondary windings on said spool terminating in said metallic terminals.

EDWIN R. GILL.

Witnesses:
CHAS. F. HALSTED,
HAROLD S. MACKAYE.